(12) United States Patent
Bull et al.

(10) Patent No.: US 9,047,184 B2
(45) Date of Patent: Jun. 2, 2015

(54) PROCESSING ERROR DETECTION WITHIN PIPELINE CIRCUITRY

(75) Inventors: David Michael Bull, Cambridge (GB); Shidhartha Das, Norwich (GB); Paul Nicholas Whatmough, Cambridge (GB)

(73) Assignee: ARM Limited, Cambridge (GB)

( * ) Notice: Subject to any disclaimer, the term of this patent is extended or adjusted under 35 U.S.C. 154(b) by 405 days.

(21) Appl. No.: 13/548,236

(22) Filed: Jul. 13, 2012

(65) Prior Publication Data

US 2014/0019815 A1  Jan. 16, 2014

(51) Int. Cl.
*H03M 13/00* (2006.01)
*G06F 11/07* (2006.01)
*G06F 11/10* (2006.01)

(52) U.S. Cl.
CPC ........ *G06F 11/0721* (2013.01); *G06F 11/1052* (2013.01); *G06F 11/0757* (2013.01); *G06F 11/0793* (2013.01)

(58) Field of Classification Search
CPC ............. G01R 31/3171; G06F 11/076; G06F 11/1008; G06F 11/14; G06F 11/0757; G06F 11/1608; G06F 11/167; H04L 1/203
USPC ............ 714/700, 775, 55, E11.143, 815, 704, 714/E11.004; 365/193; 713/400, 501, 503, 713/600
See application file for complete search history.

(56) References Cited

U.S. PATENT DOCUMENTS 6,950,350 B1 * 9/2005 Kerl .............................. 365/193
7,233,543 B2 * 6/2007 Smith et al. ............... 365/189.05
7,808,293 B2 * 10/2010 Fujisawa ....................... 327/295
8,020,039 B2 * 9/2011 Reid et al. ........................ 714/10
8,060,814 B2 * 11/2011 Blaauw et al. ................. 714/814

FOREIGN PATENT DOCUMENTS

WO    2004/084072    9/2004

OTHER PUBLICATIONS

Tschanz et al., "A 45nm Resilient and Adaptive Microprocessor Core for Dynamic Variation Tolerance", *ISSCC 2010/Session 15/Low-Power Processors & Communication*, 2010, 3 pages.
Fotjik et al., Bubble Razor: An Architecture-Independent Approach to Timing-Error Detection and Correction *ISSCC 2012 / Session 28 / Adaptive & Low-Power Circuits*, 2012, 3pages.
Choudhury et al., "Timber: Time borrowing and error relaying for online timing error resilience", *Design, Automation and Test in Europe Conference and Exhibition*, 2010, pp. 1554-1559.

(Continued)

*Primary Examiner* — Phung M Chung
(74) *Attorney, Agent, or Firm* — Pramudji Law Group PLLC; Ari Pramudji (57) ABSTRACT

An integrated circuit includes processing pipeline circuitry comprising a plurality of pipeline stages separated by respective signal value storage circuitry. Timing detection circuitry to the processing pipeline circuitry serves to detect as timing violations any signal transitions arrive at the signal value storage circuits outside respective nominal timing windows. Error detection circuitry triggers an error correcting response if the timing detection circuitry indicates a predetermined pattern comprising a plurality of timing violations spread over a plurality of clock cycles of a clock signal controlling the processing pipeline circuitry. The predetermined pattern may be two consecutive timing violations.

18 Claims, 5 Drawing Sheets

(56) References Cited

OTHER PUBLICATIONS

Bowman et al., "Energy-Efficient and Mestastability-Immune Timing-Error Detection and Instruction-Replay-Based Recovery Circuits for Dynamic-Variation Tolerance", *ISSCC 2008 / Session 22 / Variation Compensation & Measurement*, 2008, pp. 402-405.

Blaauw et al., "Razor II: In Situ Error Detection and Correction for PVT and SER Tolerance", *ISSCC 2008 / Session 22 / Variation Compensation & Measurement*, 2008, 3 pages.

Bull et al., "A Power-Efficient 32 bit ARM Processor Using Timing-Error Detection and Correction for Transient-Error Tolerance and Adaptation to PVT Variation", *IEEE Journal of Solid-State Circuits*, vol. 46, No. 1, Jan. 2011, pp. 18-31.

\* cited by examiner

PROCESSING ERROR DETECTION WITHIN PIPELINE CIRCUITRY

BACKGROUND OF THE INVENTION

1. Field of the Invention

This invention relates to data processing systems. More particularly, this invention relates to data processing systems incorporating processing pipeline circuitry comprising a plurality of pipeline stages with signal value storage circuits interposed therebetween and incorporating error detection mechanisms.

2. Description of the Prior Art

It is known from WO 2004/084072 to provide data processing systems incorporating processor pipelines that detect errors due to the late arrival of signal transitions at the signal value storage circuits interposed between the processing pipelines. The late arrival of a signal transition at the output of a pipeline stage can give rise to a processing error from which a recovery operation is triggered.

Figure 1:
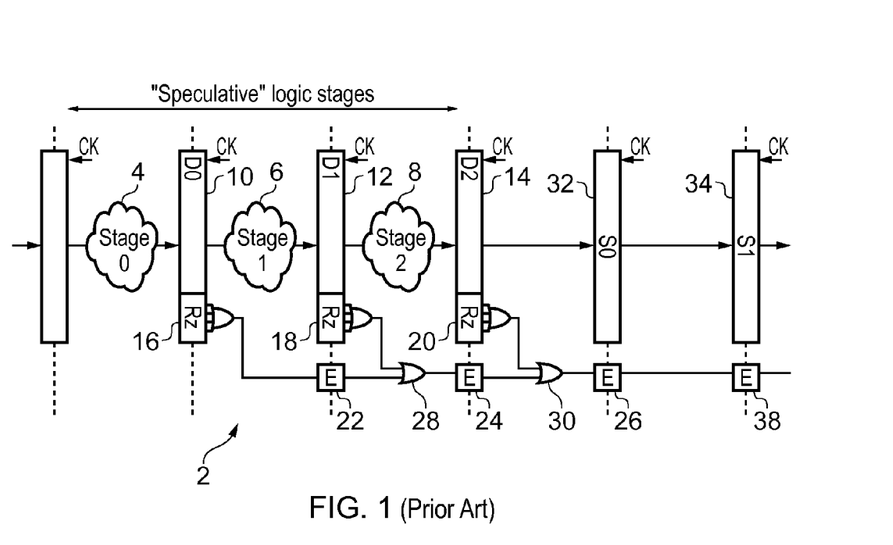
FIG. 1 schematically illustrates processing pipeline circuitry.

FIG. 1 of the accompanying drawings schematically illustrates processing pipeline circuitry 2 comprising a plurality of pipeline stages 4, 6, 8 with respective signal value storage circuits 10, 12, 14 interposed therebetween. Timing detection circuitry 16, 18, 20 serves to detect signal transitions arriving outside of a nominal timing window at respective signal value storage circuits 10, 12, 14. If a timing violation is detected, then this gives rise to an error signal which is stored within an error latch 22, 24, 26. The error signal E is accumulated as it passes between the pipeline stages by the action of the OR gates 28, 30.

At the output end of the pipeline processing circuitry 2 there are provided two additional pipeline stages with associated signal value storage circuits 32, 34. These additional pipeline stages serve the function of synchronising and stabilising any error signal generated due to a timing violation within the pipeline processing circuitry 2. It will be appreciated that the timing detection circuitry 16, 18, 20 generate an error indicating signal. The error signal is nominally synchronous, but in the event of a near timing violation metastability can occur, and this can cause the error signal to fall at a time which is not synchronised to the next clock edge. As such the error signal is typically considered as an asynchronous signal, and is passed through two synchronising pipeline line stages 32, 34 to reduce the probability of metastability propagating into the error correction logic which is not speculative at the end of the pipeline. This increases the latency associated with obtaining an error signal from the pipeline processing circuitry 2 indicating whether or not a timing violation occurred within the processing pipeline circuitry 2.

Figure 2:
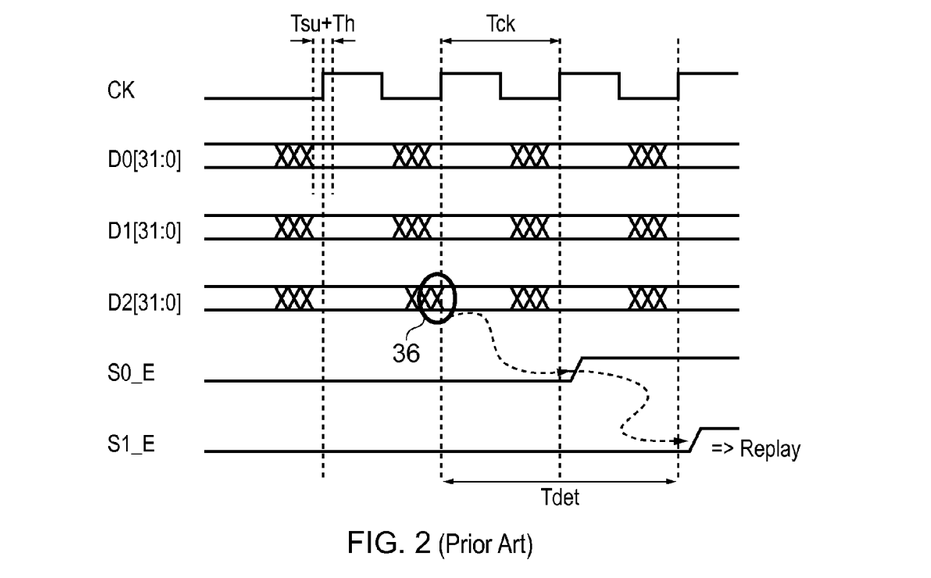
FIG. 2 schematically illustrates a signal timing diagram for explaining the operation of the pipeline circuitry of FIG. 1.

FIG. 2 of the accompanying drawings is a signal diagram schematically illustrating the operation of the processing pipeline circuitry 2 of FIG. 2. A clock signal CK serves to control and regulate the processing performed by the processing pipeline circuitry 2. Signal values are captured into the signal value storage circuitry 10, 12, 14, 32, 34 at the rising edge of the clock signal CK. A nominal timing window corresponding to the period preceding the setup time before the rising edge of the clock signal CK and corresponds to the period within which during normal operation one would expect a signal transition to arrive at a signal value storage circuit 10, 12, 14, 32, 34. If a signal transition occurs outside of this nominal timing window, then it corresponds to a timing violation and an error signal is generated. The signals D2 [31:0] correspond to the signal values input to the signal value storage circuitry 14 of FIG. 1. In the example of FIG. 2, one or more signal transitions within the signals D2 [31:0] arrive late and are outside the nominal timing window. The timing detection circuitry 20 detects this late arriving signal transition and asserts an error signal which is stored into the latch 26 at the next rising edge of the clock signal CK. This error signal is then passed along to the latch 38 associated with the final pipeline stage and is output from the pipeline processing circuitry 2 to indicate that a timing error has occurred within the pipeline processing circuitry 2.

SUMMARY OF THE INVENTION

Viewed from one aspect the present invention provides an apparatus for processing data comprising:

processing pipeline circuitry having a plurality of pipeline stages with respective signal value storage circuits interposed therebetween, said signal value storage circuits configured to be transparent to received signal values during a transparent phase of a clock signal controlling said signal value storage circuits;

timing detection circuitry coupled to said processing pipeline circuitry and configured to detect as timing violations if signal transitions arrive at said signal value storage circuits outside respective nominal timing windows; and error detection circuitry coupled to said timing detection circuitry and configured to trigger an error correcting response if said timing detection circuitry indicates a predetermined pattern comprising a plurality of timing violations spread over a plurality of cycles of said clock signal.

The present technique recognises that when detecting timing errors on a per processing pipeline circuitry basis (i.e. that an error has occurred somewhere along the processing pipeline circuitry), then there is the possibility that a signal transition arriving outside of a nominal timing window associated with one pipeline stage may not result in incorrect processing if left to propagate through the processing pipeline as a subsequent pipeline stage may process that signal transition more rapidly and result in the signal transition arriving within the nominal timing window at a later clock cycle boundary. The signal value storage circuits are transparent to receive signal values during a transparent phase of a clock signal controlling them in order that late arriving signal transitions can propagate through the signal value storage circuits and enter the subsequent pipeline processing stage where they have a chance to regain nominal timing. A late arriving signal transition at one signal value storage circuit may effectively borrow time from a later clock cycle and potentially regain nominal timing. If a timing violation is corrected in this way, then there is no need to trigger an error recovery operation and incur the time and energy penalty associated with such an error recovery operation. However, not all timing violations will be corrected by borrowing time from subsequent clock cycles and accordingly the error detection circuitry will trigger an error correcting response if the timing detection circuitry indicates a predetermined pattern comprising a plurality of timing violations spread over a plurality of cycles of the clock signal. At some point the number and/or arrangement of the timing violations will become such that it is desirable to trigger an error correcting response as the time borrowing capabilities associated with the processing pipeline circuitry including transparent signal value storage circuits will not be able or likely to correct the timing errors that have arisen.

It will be appreciated that the predetermined pattern comprising a plurality of timing violations may take a variety of different forms. Processing pipelines may involve signal feedback and a timing violation may occur repeatedly within a single pipeline stage as a consequence of an initial timing violation. It is also possible that a timing violation may propagate along the processing pipeline circuitry between different stages as the signal value transition associated with that timing violation propagates between those pipeline stages.

In some example embodiments a predetermined pattern used to trigger an error correcting response may comprise timing violations occurring at N successive signal value storage circuits, where N is an integer of two or more. One simple technique is when the predetermined pattern comprises timing violations arising at two successive signal value storage circuits indicating that when a timing violation occurred at one signal value storage circuit, it was unable to borrow sufficient time from the following pipeline stage to meet its timing requirements at the next signal value storage circuitry and accordingly error correction through time borrowing had not succeeded.

In some embodiments the error correction circuitry may identify as a resolved timing violation occurrence of a timing violation at a given signal value storage circuit followed by a next signal value storage circuitry in which no timing violation arises. This corresponds to one or more timing violations being followed by no timing violation as the signal transition propagates thereby indicating that time borrowing has succeeded in resolving the timing error.

The nominal timing window may in some cases extend beyond the start of the transparent phase. When using transparent signal value storage circuits, their ability to pass a late arriving signal transition through to the following pipeline stage can give rise to a degree of time borrowing that need not even be flagged as a timing violation. In this way a signal transition occurring within a period that begins within the setup margin time before the start of the transparent phase and ends a timing violation tolerated time after this start time may be regarded as meeting the nominal timing and falling within the nominal timing window. Only a signal transition arising after the ending of the timing violation tolerated time need be treated as a timing violation as it corresponds to a degree of time borrowing greater than that provided by the timing violation tolerated time. When a predetermined pattern of such timing violations occurring over successive clock cycles is detected, then this gives rise to an error response.

When an error response is triggered by N timing violations in successive stages, this has the consequence that, if a timing violation first arises within fewer than N pipeline stages of the end of the processing pipeline, then it will not match this predetermined pattern criteria and will not trigger an error. Accordingly, the error detecting circuitry may be configured to "look ahead" and to generate a signal indicating that the predetermined pattern has not been detected in the pipeline without any dependence upon the occurrence of any timing violations arising in any signal value storage circuits receiving signal values from the final (N−1) pipeline stages of the pipeline processing circuitry. This reduces the latency associated with the generation of the error signal indicating that an error has arisen within the processing pipeline circuitry. An early error indication signal taken from the N−1 stage is such that it if it is set to zero then it is known that an error cannot occur. If the early error signal is set to 1, then an error may or may not occur depending on what happens in the final processing stage. The early error signal can either be used as a pessimistic error signal which is used directly to action error detection, or it may be used to indicate early that an error is possible so as to prepare the error detection mechanism for possible activation. The early error signal could be used for example as a clock gating enable signal for the error correction circuits in order to be able to save clock power.

In some embodiments error correcting circuitry is provided that is coupled to the error detection circuitry and is configured to perform an error correction operation that corrects for occurrence of the predetermined pattern of timing errors as the error correcting response. Examples of the error correction operation include one or more of stalling the processing pipeline for one or more clock cycles; replaying those processing operations that gave rise to the error correcting response through the processing pipeline circuitry; and resetting the processing pipeline circuitry. These different error correction operations have different levels of circuit overhead associated with their implementation and different levels of cost in terms of delay and energy. The error correction operation performed may be selected in dependence upon the nature of the timing violations detected so as to select an error correction operation that is capable of dealing with those timing violations with a reduced cost in terms of processing delay and/or energy.

In some embodiments there may be provided operating parameter control circuitry that is configured to control one or more operating parameters of the apparatus in dependence upon the triggering of the error correcting response so as to maintain a finite non-zero rate of occurrence of the error correcting response. This recognises that there may be an overall benefit in operating the apparatus with operating parameters that cause errors as the gains achieved in using those operating parameters more than offset the time and/or energy costs in correcting the errors that result. Examples of the operating parameters that may be adjusted include a clock frequency of the clock signal and an operating voltage of the apparatus.

It will be appreciated that the detection of timing violations and then the detection of a predetermined pattern of timing violations provides more than one feedback parameter for controlling the operating parameters. This permits more sophisticated and advantageous types of operating parameter control to be achieved. In some embodiments the operating parameters may be controlled in dependence of the occurrence of one or more timing violations independently of whether or not the predetermined pattern is detected. In other embodiments the operating parameter control may be performed in dependence upon occurrence of the one or more timing violations in combination with the detection of the predetermined pattern, potentially with the error response being selected in dependence upon which combination is detected.

While it is possible that the present techniques could be utilised in a different context, the present techniques are well suited to implementation within the context of an integrated circuit which comprises an apparatus for processing data as described above.

Viewed from another aspect the present invention provides apparatus for processing data comprising:

processing pipeline means for processing data, said pipeline processing means having a plurality of pipeline stage means for processing a respective signal value with respective signal value storage means for storing a signal value interposed therebetween, said signal value storage means configured to be transparent to received signal values during a transparent phase of a clock signal controlling said signal value storage means;

timing detection means for detecting timing violations and coupled to said processing pipeline means, said timing detection means configured to detect as timing violations if signal transitions arrive at said signal value storage means outside respective nominal timing windows; and error detection means for detecting error and coupled to said timing detection means, said error detection means configured to trigger an error correcting response if said timing detection means indicates a predetermined pattern comprising a plurality of timing violations spread over a plurality of cycles of said clock signal.

Viewed from a further aspect the present invention provides a method of processing data comprising the steps of:

processing data within processing pipeline circuitry having a plurality of pipeline stages with respective signal value storage circuits interposed therebetween, said signal value storage circuits configured to be transparent to received signal values during a transparent phase of a clock signal controlling said signal value storage circuits;

detecting as timing violations if signal transitions arrive at said signal value storage circuits outside respective nominal timing windows; and triggering an error correcting response if said step of detecting indicates a predetermined pattern comprising a plurality of timing violations spread over a plurality of cycles of said clock signal.

The above, and other objects, features and advantages of this invention will be apparent from the following detailed description of illustrative embodiments which is to be read in connection with the accompanying drawings.

DESCRIPTION OF THE EMBODIMENTS

Figure 3:
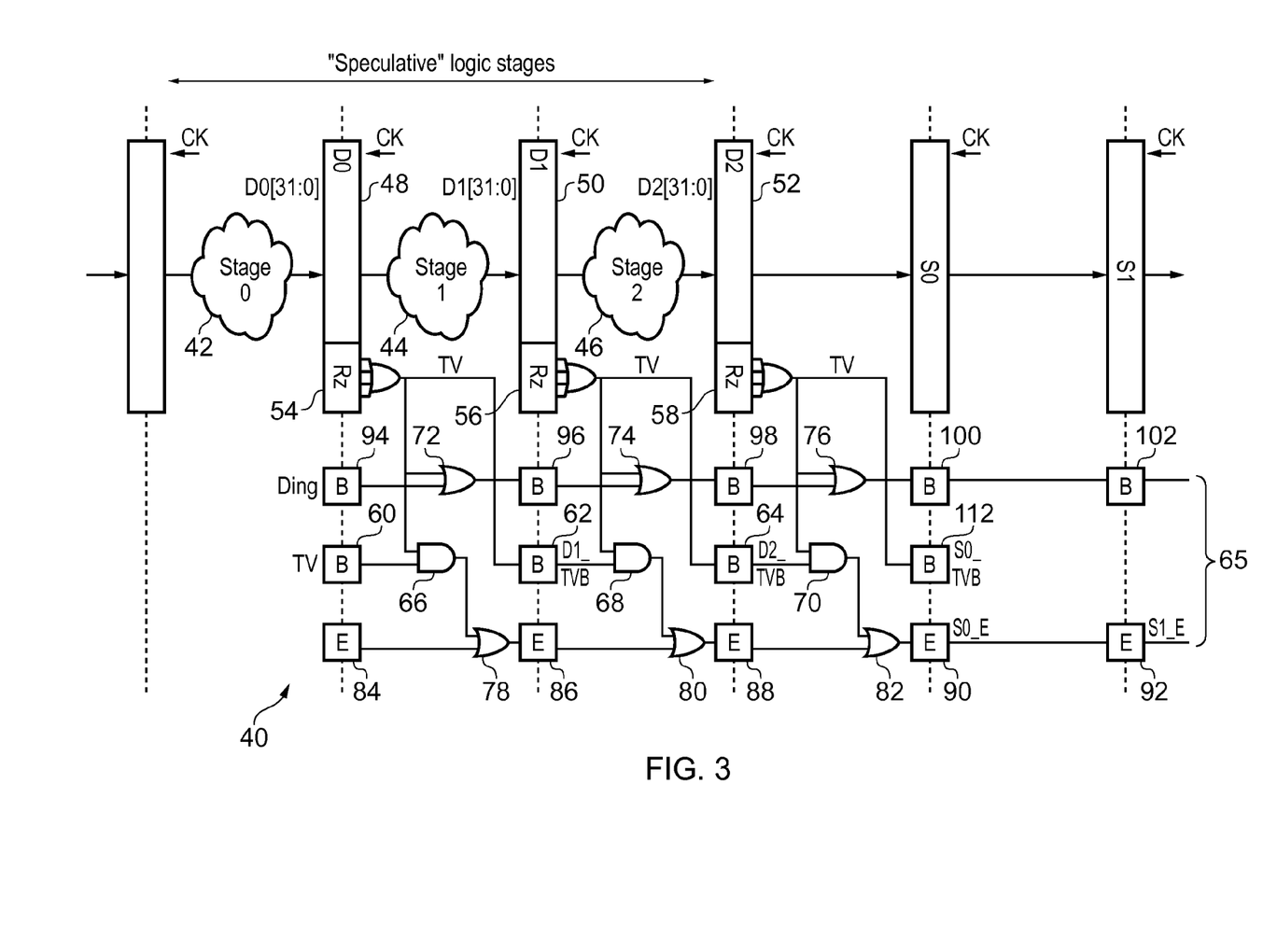
FIG. 3 schematically illustrates processing pipeline circuitry including error detection circuitry that serves to trigger an error correcting response if a predetermined pattern of timing violations arises within the processing pipeline circuitry.
Figure 4:
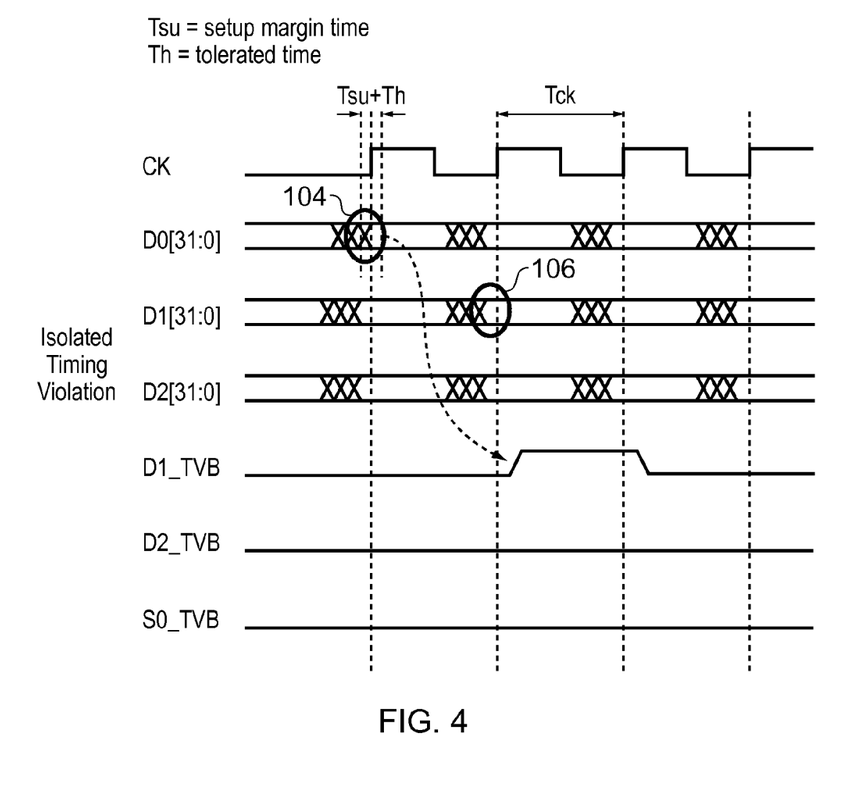
FIG. 4 is a signal timing diagram illustrating the operation of the processing pipeline circuitry of FIG. 3 when an isolated timing violation arises that is corrected through time borrowing.
Figure 5:
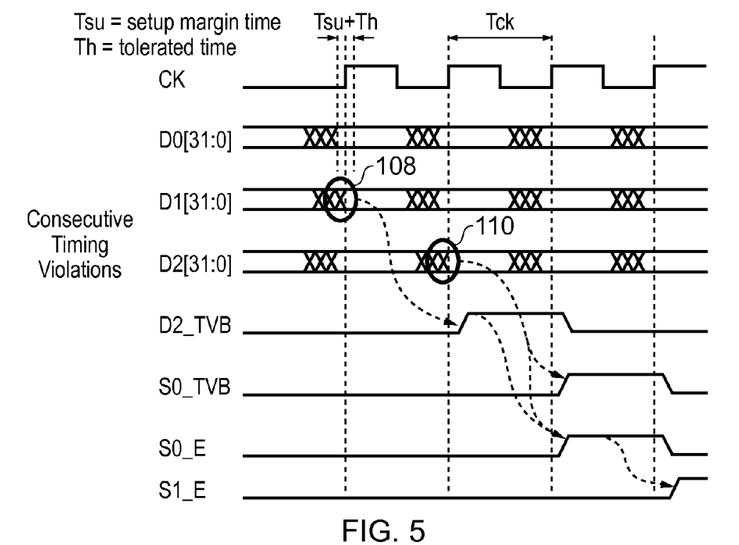
FIG. 5 is a signal timing diagram illustrating the operation of the processing pipeline circuitry of FIG. 3 when a predetermined pattern of timing violations arises that is used to trigger an error correcting response.

FIG. 3 schematically illustrates processing pipeline circuitry 40 having a plurality of pipeline stages 42, 44, 46 each with respective signal value storage circuits 48, 50, 52 disposed therebetween (i.e. a signal value storage circuit 48, 50, 52 is disposed at the output of each processing stage 42, 44, 46 and serves to capture and store the signal values output from that pipeline stage 42, 44, 46 and then pass these stored signal values to the following pipeline stage. Timing detection circuitry 54, 56, 58 is coupled to each of the signal value storage circuits 48, 50, 52 that receives signals from pipeline stages conducting processing and accordingly receives signals in which the signal value transitions may arrive outside the nominal timing window (e.g. too late). These timing detection circuits 54, 56, 58 are configured to detect as timing violations if a signal transition arrives at them outside a nominal timing window. In some embodiments the nominal timing window may finish a set up margin time before the rising edge of the clock signal CK which triggers the signal value storage circuits 48, 50, 52 to capture the signal value presented at their inputs. In such embodiments a timing violation would arise if a signal transition occurred after the setup margin time had started. This type of operation is illustrated in FIGS. 4 and 5 which follow. In the present context the setup time is defined by the clock to output delay of the storage element. If setup time is met, then the output time of the storage element is determined only by the time taken to open the latch, i.e. if setup is met then no borrowing from the next processing stage will occur.

In other embodiments the transparent nature of the signal value storage circuits 48, 50, 52 in which they pass a late arriving transition through to the next pipeline stage may be exploited to extend the nominal timing window. In such embodiments, the nominal timing window may be extended to encompass both the set up margin time and a timing violation tolerated time which occurs after the start of the transparent phase (rising edge of the clock signal CK). In such embodiments a timing violation will be triggered if a signal transition is detected after the end of the timing violated tolerated time following a rising edge in the clock signal CK. Thus, signals arriving after the rising edge will not be detected as timing violations unless they arrive after the end of the timing violation tolerated time. Even such late arriving signal transitions will not give rise to triggering of an error correcting response unless a predetermined pattern of such timing violations occurs spread over a plurality of cycles of the clock signals CK.

The timing detection circuitry 54, 56, 58 gives rise to timing violation signals TV which are supplied to time borrowing latches 60, 62, 64 which output a timing violation borrow signal TVB that indicates that a preceding pipeline stage has suffered a timing violation (e.g. late arriving signal transition) and borrowed some time from the current pipeline stage. Thus, a timing violation borrow signal output from latch 62 during a given clock cycle indicates that the timing detection circuitry 54 at the output of the preceding pipeline stage received a late signal transition following the start of the preceding clock cycle, i.e. a late transition in the signals D0 [31:0] arriving at signal value storage stage 48.

Error detection circuitry 65 coupled to the timing detection circuitry 54, 56, 58 includes the latches 60, 62, 64 as well as AND gates 66, 68, 70 and OR gates 72, 74, 76, 78, 80, 82. The AND gates 66, 68, 70 serve to AND together a timing violation TV signal arising during the current clock cycle with a latched timing violation borrow signal TVB from the preceding clock cycle (if this was set). This AND operation produces an error indicating signal E if a timing violation signal TV is asserted in the current clock cycle and a timing violation occurred in the preceding clock cycle. The error signal so asserted is latched at the end of the current clock cycle within one of the error latches 84, 86, 88, 90.

The action of the AND gates 66, 68, 70 is to detect a predetermined pattern comprising a plurality of timing violations (namely two) spread over a plurality of cycles of clock signal (namely the current clock signal and the preceding clock signal).

It will be appreciated that with different logic gate combinations, different predetermined patterns may be detected. For example, a longer sequence of consecutive timing violations may be detected using AND gates with a larger number of inputs and latches which store timing violation borrow signals TVB for more than a single clock cycle. Furthermore, feedback of signals within pipeline stages is relatively common and a timing violation may occur within the same pipeline stage but at different consecutive clock cycles and this may correspond to a predetermined pattern which should give rise to an error correcting response. Variations in the logic gates and latches provided within the error direction circuitry 66 are possible such that a wide variety of different predetermined patterns may be detected if desired.

The function of the latches 84, 86, 88, 90 and the OR gates 78, 80, 82 is such as to accumulate an error signal. Thus, if the predetermined pattern is detected at any time and any position along the processing pipeline circuitry 40, then an error indicating signal is asserted and this is passed along between the latches 84, 86, 88, 90 until it reaches a final latch 92 from which it may be used to trigger an error correcting response. It will be seen from FIG. 3 that a timing violation is highly unlikely in the final stages of the pipeline and accordingly the signal indicating whether or not an error could occur may in some embodiments be taken from the error latch 90 thereby reducing the latency associated with the issue of this signal. A timing violation that does occur in the final stage will not trigger an error correcting response since unless a preceding timing violation has occurred, the predetermined pattern of two consecutive timing violations will not be met. An early error indication signal taken from the N−1 stage is such that it if it is set to zero then it is known that an error cannot occur. If the early error signal is set to 1, then an error may or may not occur depending on what happens in the final processing stage. The early error signal can either be used as a pessimistic error signal which is used directly to action error detection, or it may be used to indicate early that an error is possible so as to prepare the error detection mechanism for possible activation. The early error signal could be used for example as a clock gating enable signal for the error correction circuits in order to be able to save clock power.

The action of the logic gates within the error detection circuitry is such that if a timing violation is detected, but a following pipeline stage performs its processing without generating a propagated timing violation, then the initial timing violation will be treated as a resolved timing violation and the timing violation borrow signal that was asserted will be cleared without giving rise to an error signal E. In some different embodiments, it may be desired that an error correcting response will not be triggered unless the timing violation borrow signal propagates all the way to the end of the processing pipeline circuitry 40, i.e. a sequence of one or more timing violations arriving at successive signal value storage circuits that is not followed by a signal value storage circuit at which a timing violation does not arise. Any pipeline stage which meets its timing can thus terminate the propagation of a timing violation borrow signal and accordingly prevent the triggering of an error correcting response.

Diagnostic latches 94, 96, 98, 100, 102 within the error detection circuitry 66 may serve to accumulate a diagnostic borrow signal which indicates that a timing violation has occurred somewhere along the processing pipeline processing circuitry 40 even though this was later resolved. A timing violation borrow signal which is latched within one of the diagnostic latches 94, 96, 98, 100, 102 will propagate all the way through to the end of the processing pipeline circuitry 40.

FIG. 4 is a timing diagram schematically illustrating the operation of the circuitry of FIG. 3 in response to an isolated timing violation. At time 104 a signal value transition occurs outside of the nominal timing window (i.e. within the timing setup time for this example embodiment) and gives rise to a timing violation being detected by the timing detection circuitry 54 associated with signal value storage circuitry 48. This timing violation TV signal is captured within the timing violation borrow latch 62 at the start of the next clock cycle. In this example, the next clock cycle does not give rise to a further timing violation at the inputs to the signal value storage circuitry 48 and accordingly the output from the timing violation borrow latch 62 will be cleared at the end of one cycle without giving rise to an error signal.

As illustrated in FIG. 4, the timing violation 104 which occurred at the inputs to the signal value storage circuitry 48 results in a late transition entering the pipeline circuitry 44 due to the transparent nature of the signal value storage circuitry 48 during the transparent phase (high phase) of the clock signal CK. This signal value propagates through into the pipeline stage 44 and is processed sufficiently quickly that when a corresponding signal transition occurs to be captured by the signal value storage circuitry 50, it arrives within its nominal timing window and there is no timing violation at time 106. Thus, the output from the timing detection circuitry 56 associated with the signal value storage circuitry 50 will not indicate a timing violation. The AND gate 68 receives the stored timing violation borrow signal TVB from the timing violation borrowed latch 62, but no asserted input from the timing detection circuitry 56 and accordingly will not raise an error signal passed via OR gate 80 to error latch 88. Thus, the predetermined pattern of two consecutive timing violations does not arise and no error correcting response is triggered. FIG. 4 accordingly illustrates how an isolated timing violation is tolerated.

FIG. 5 is a signal diagram schematically illustrating the operation of the circuitry of FIG. 3 when consecutive timing violations arise corresponding to a predetermined pattern which triggers an error correcting response. A first timing violation occurs due to a late signal transition at time 108, namely a late arriving transition at the inputs to signal value storage circuitry 50. This late transition gives rise to the storing of a timing violation borrow signal TVB within timing violation borrow latch 64 at the start of the next clock cycle. This timing violation borrow latch 64 will accordingly assert a high output for one clock signal as signal D2_TVB.

The late signal transition occurring at time 108 passes through the transparent signal value storage circuitry 50 and enters the pipeline circuitry 46. However, in this example, the timing violation is not overcome within the pipeline circuitry 46 and propagates through the inputs to the signal value storage circuitry 52 at time 110. The timing detection circuitry 58 generates a timing violation signal TV which is stored within the timing violation borrow latch 112. This timing violation borrow latch 112 thus asserts a high signal value for one clock signal as illustrated by the signal line S0_TVB.

As well as outputting the timing violation signal TV to the timing value borrow latch 112, this timing violation signal TV is also output to the AND gate 70 where it is combined with the asserted output D2_TVB from the timing value borrow latch 64 and generates an error signal which passes through the OR gate 82 and is latched within the error latch 90. Thus, in the clock cycle following the clock cycle in which the timing violation at time 110 was detected, the output from the error latch 90 will be asserted high as indicated by the signal S0_E in FIG. 5. This error signal is propagated through to the error latch 92 which generates the final error correcting response triggering signal S1_E that is output from the error detection circuitry 66.

FIG. 5 accordingly illustrates how timing violations in successive clock cycles correspond to a predetermined pattern spread over a plurality of clock cycles which gives rise to an error correcting response by triggering an error signal which is propagated along the chain of error latches 84, 86, 88, 90, 92 (in this example starting at the latch 90).

Figure 6:
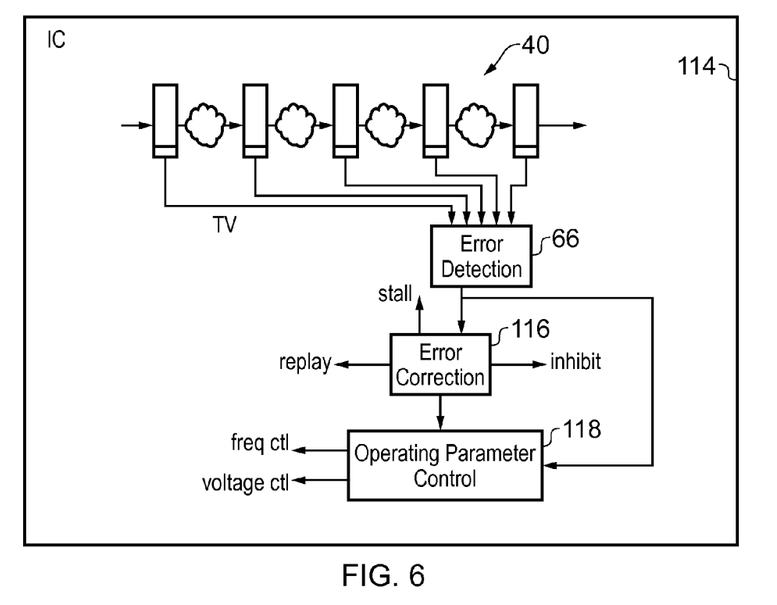
FIG. 6 schematically illustrates an integrated circuit including processing pipeline circuitry as illustrated in FIG. 3, error detection circuitry, error correction circuitry and operating parameter control circuitry.

FIG. 6 schematically illustrates an integrated circuit 114 including pipeline processing circuitry 40 and error detection circuitry 66 as previously discussed. Error correcting circuitry 116 is coupled to the error detection circuitry 66 and when the error correcting circuitry 66 indicates that an error response is required, then the error correction circuitry 116 controls the performance of such an error correcting operation. The error correcting operation may, for example, be: to stall the processing pipeline for one or more clock cycles while inhibiting use of incorrect signals already generated; replaying the processing operations which gave rise to the error correcting response (such as in their entirety having flushed the pipeline), or in some simple examples resetting the processing pipeline circuitry where this may be tolerated.

Operating parameter control circuitry 118 coupled to the error correcting circuitry 116 is responsive to the occurrence of error correction operations to adjust operating parameters, such as the clock frequency and the operating voltage of the integrated circuit 114, in dependence upon the rate of occurrence of error correcting operations so as to maintain a finite non-zero error rate. The operating parameter control circuitry 118 may also receive signals from the error detecting circuitry 66 indicative of timing violations even when these do not give rise to error correcting responses. The operating parameter control circuitry 118 may accordingly in some embodiments vary the operating parameters in dependence upon the occurrence of such timing violations independently of the occurrence of error correcting responses. In other embodiments, a combination of error correcting responses and timing violations may be used to adjust the operating parameters.

Figure 7:
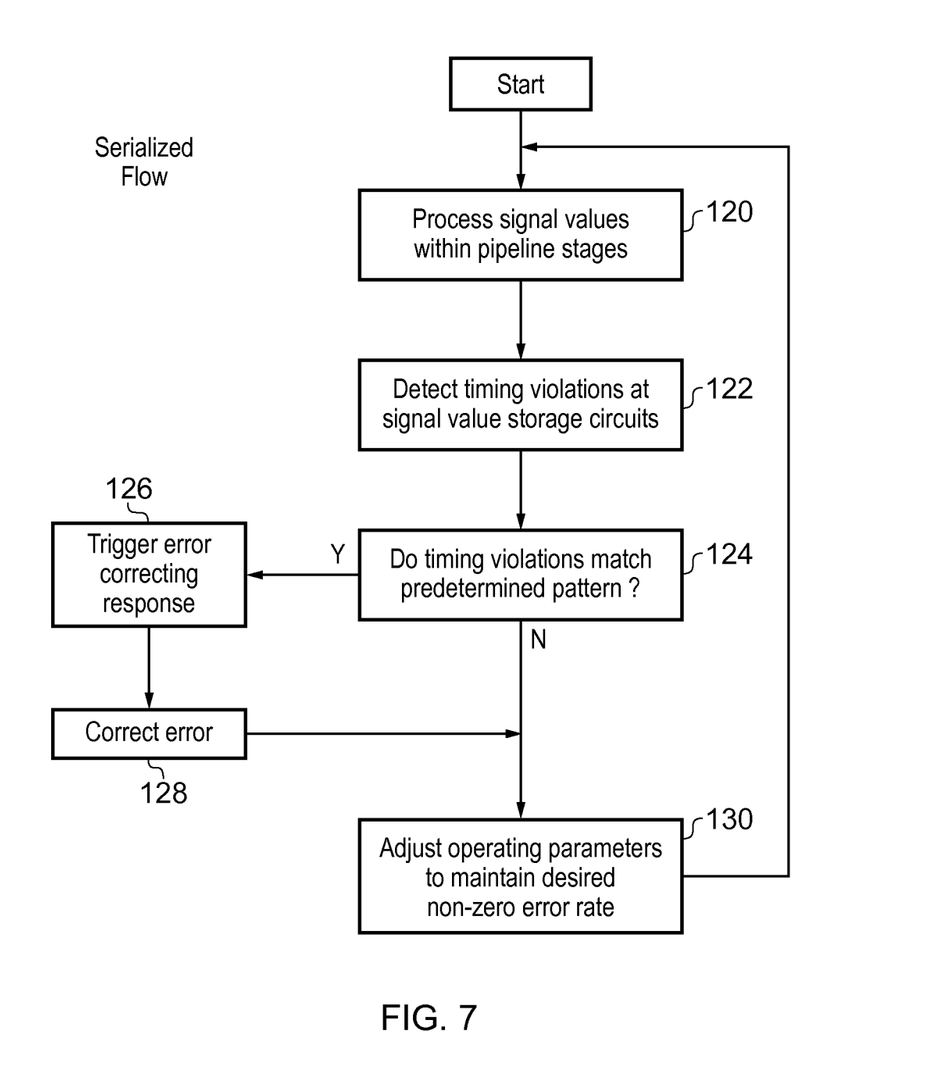
FIG. 7 is a flow diagram schematically illustrated in a serialised form the processing operations performed in the processing pipeline circuitry of FIG. 3.

FIG. 7 is a flow diagram schematically illustrating the operation of the circuitry of FIG. 3. It will be appreciated by those in this technical field that FIG. 7 represents a serialised flow of operations whereas in practice the operations are performed in parallel or even in a different order to that illustrated. The flow diagram will thus be regarded as an aid to understanding rather than a literal representation of a processing flow that is performed.

At step 120 signal values are processed within the pipeline stages 42, 44, 46. At step 122 timing violations within the signals received by the signal value storage circuits 48, 50, 52 are detected by the timing detection circuitry 54, 56, 58. At step 124 a determination is made as to whether or not any timing violation is detected that matches a predetermined pattern. If there is a match to the predetermined pattern, then step 126 triggers an error correcting response which is performed at step 128. Either following step 128, or step 124 where there is no predetermined pattern match, step 130 serves to adjust the operating parameters, such as clock frequency and operating voltage, so as to maintain a predetermined target non-zero error rate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
    processing pipeline circuitry having a plurality of pipeline stages with respective signal value storage circuits interposed therebetween, said signal value storage circuits configured to be transparent to received signal values during a transparent phase of a clock signal controlling said signal value storage circuits;
    timing detection circuitry coupled to said processing pipeline circuitry and configured to detect as timing violations if signal transitions arrive at said signal value storage circuits outside respective nominal timing windows; and
    error detection circuitry coupled to said timing detection circuitry and configured to trigger an error correcting response if said timing detection circuitry indicates a predetermined pattern comprising a plurality of timing violations spread over a plurality of cycles of said clock signal.

2. The apparatus as claimed in claim 1, wherein said plurality of timing violations result from an effect of a signal transition outside a given nominal timing window of a given signal value storage circuit propagating within said processing pipeline circuitry and giving rise to said plurality of timing violations spread over said plurality of cycles.

3. The apparatus as claimed in claim 2, wherein said predetermined pattern comprises timing violations arising at two successive signal value storage circuits.

4. The apparatus as claimed in claim 2, wherein said error detecting circuitry is configured to generate a signal indicating said predetermined pattern has not been detected within said pipeline without any dependence upon occurrence of any timing violations arising at any signal value storage circuits receiving signal values from a final (N−1) pipeline stages of said pipeline processing circuitry.

5. The apparatus as claimed in claim 1, wherein said predetermined pattern of timing violations arise at a plurality of different signal value storage circuits along said processing pipeline circuitry.

6. The apparatus as claimed in claim 1, wherein said predetermined pattern comprises timing violates arising at N successive signal value storage circuits, where N is an integer of two or more.

7. The apparatus as claimed in claim 1, wherein said error detection circuitry identifies as a resolved timing violation a detection of a timing violation at a given signal value storage circuit followed by a next signal value storage circuit in which no timing violation arises.

8. The apparatus as claimed in claim 1, wherein said nominal timing window encompasses a start time of said transparent phase beginning a setup margin time before said start time and ending a timing violation tolerated time after said start time.

9. The apparatus as claimed in claim 1, wherein said predetermined pattern is a sequence of one or more timing violations arising at successive signal value storage circuits that is not followed by a signal value storage circuit at which a timing violation does not arise.

10. The apparatus as claimed in claim 1, comprising error correcting circuitry coupled to said error detection circuitry and configured to perform an error correction operation that corrects for occurrence of said predetermined pattern of timing errors as said error correcting response.

11. The apparatus as claimed in claim 10, wherein said error correction operation is one or more of:
    stalling said processing pipeline circuitry for one or more clock cycles;
    replaying those processing operations that gave rise to said error correcting response through said processing pipeline circuitry; and
    resetting said processing pipeline circuitry.

12. The apparatus as claimed in claim 10, wherein said one or more operating parameters include one or more of:
  a clock frequency of said clock signal; and
  an operating voltage of said apparatus.

13. The apparatus as claimed in claim 1, comprising operating parameter control circuitry configured to control one or more operating parameters of said apparatus in dependence upon triggering of said error correcting response so as to maintain a finite non-zero rate of occurrence of said error correcting response.

14. The apparatus as claimed in claim 13, wherein said operating parameter control circuitry is configured to control at least some of said one or more operating parameters in dependence upon occurrence of one or more timing violations independently of detection of said predetermined pattern.

15. The apparatus as claimed in claim 13, wherein said operating parameter control circuitry is configured to control at least some of said one or more operating parameters in dependence upon occurrence of one or more timing violations in combination with detection of said predetermined pattern.

16. An integrated circuit comprising the apparatus as claimed in claim 1.

17. Apparatus for processing data comprising:
  processing pipeline means for processing data, said pipeline processing means having a plurality of pipeline stage means for processing a respective signal value with respective signal value storage means for storing a signal value interposed therebetween, said signal value storage means configured to be transparent to received signal values during a transparent phase of a clock signal controlling said signal value storage means;
  timing detection means for detecting timing violations and coupled to said processing pipeline means, said timing detection means configured to detect as timing violations if signal transitions arrive at said signal value storage means outside respective nominal timing windows; and
  error detection means for detecting error and coupled to said timing detection means, said error detection means configured to trigger an error correcting response if said timing detection means indicates a predetermined pattern comprising a plurality of timing violations spread over a plurality of cycles of said clock signal.

18. A method of processing data comprising the steps of:
  processing data within processing pipeline circuitry having a plurality of pipeline stages with respective signal value storage circuits interposed therebetween, said signal value storage circuits configured to be transparent to received signal values during a transparent phase of a clock signal controlling said signal value storage circuits;
  detecting as timing violations if signal transitions arrive at said signal value storage circuits outside respective nominal timing windows; and
  triggering and performing an error correcting response if said step of detecting indicates a predetermined pattern comprising a plurality of timing violations spread over a plurality of cycles of said clock signal.

* * * * *